US009822705B2

(12) United States Patent
Kim et al.

(10) Patent No.: US 9,822,705 B2
(45) Date of Patent: Nov. 21, 2017

(54) POWER AUGMENTATION SYSTEM FOR A GAS TURBINE

(71) Applicant: General Electric Company, Schenectady, NY (US)

(72) Inventors: Kihyung Kim, Atlanta, GA (US); Diego Fernando Rancruel, Mauldin, SC (US); Leslie Yung Min Tong, Roswell, GA (US); Stephen R. Watts, Greer, SC (US); Kamlesh Mundra, Clifton Park, NY (US)

(73) Assignee: GENERAL ELECRIC COMPANY, Schenectady, NY (US)

( * ) Notice: Subject to any disclaimer, the term of this patent is extended or adjusted under 35 U.S.C. 154(b) by 178 days.

(21) Appl. No.: 14/797,302

(22) Filed: Jul. 13, 2015

(65) Prior Publication Data

US 2017/0016395 A1    Jan. 19, 2017

(51) Int. Cl.
| | |
|---|---|
| F02C 6/16 | (2006.01) |
| F02C 1/02 | (2006.01) |
| F02C 3/30 | (2006.01) |
| F02C 6/08 | (2006.01) |
| F02C 7/143 | (2006.01) |

(Continued)

(52) U.S. Cl.
CPC ................ *F02C 6/16* (2013.01); *F01D 15/10* (2013.01); *F02C 1/02* (2013.01); *F02C 3/04* (2013.01); *F02C 3/305* (2013.01); *F02C 6/08* (2013.01); *F02C 7/143* (2013.01); *F02C 7/18* (2013.01); *F05D 2220/32* (2013.01); *F05D 2220/62* (2013.01); *F05D 2220/76* (2013.01); *F05D 2260/213* (2013.01); *F05D 2270/053* (2013.01); *F05D 2270/061* (2013.01); *F05D 2270/091* (2013.01); *Y02E 60/15* (2013.01)

(58) Field of Classification Search
CPC ...... F02C 6/14; F02C 6/16; F02C 1/02; F02C 7/18; F02C 7/143; F02C 7/185
See application file for complete search history.

(56) References Cited

U.S. PATENT DOCUMENTS

| | | | |
|---|---|---|---|
| 3,831,373 A | 8/1974 | Flynt | |
| 5,537,822 A * | 7/1996 | Shnaid | F02C 6/04 60/650 |

(Continued)

FOREIGN PATENT DOCUMENTS

| | | |
|---|---|---|
| EP | 2 284 375 A1 | 2/2011 |
| JP | 2001-193483 A | 7/2001 |

(Continued)

OTHER PUBLICATIONS

Klosinski et al., U.S. Appl. No. 14/819,770, filed Aug. 6, 2015.

(Continued)

*Primary Examiner* — Ehud Gartenberg
*Assistant Examiner* — James McGlynn
(74) *Attorney, Agent, or Firm* — Dority & Mznning, PA

(57) ABSTRACT

A power augmentation system for a gas turbine that is electrically coupled to a power grid incudes, in serial flow order, a compressed air supply, a compressed air storage tank and an expansion turbine that is disposed downstream from the compressed air storage tank. An exhaust outlet of the expansion turbine is in fluid communication with at least one of an inlet section or a compressor of the gas turbine.

20 Claims, 2 Drawing Sheets

(51) Int. Cl.
*F02C 7/18* (2006.01)
*F01D 15/10* (2006.01)
*F02C 3/04* (2006.01)

(56) References Cited

U.S. PATENT DOCUMENTS

| | | | |
|---|---|---|---|
| 5,845,479 | A | 12/1998 | Nakhamkin et al. |
| 5,934,063 | A | 8/1999 | Nakhamkin |
| 6,038,849 | A | 3/2000 | Nakhamkin et al. |
| 6,134,873 | A | 10/2000 | Nakhamkin et al. |
| 6,305,158 | B1 | 10/2001 | Nakhamkin et al. |
| 6,474,069 | B1 | 11/2002 | Smith |
| 6,519,944 | B2 | 2/2003 | Smith |
| 6,745,569 | B2 * | 6/2004 | Gerdes ............... F02C 6/16 60/39.183 |
| 6,766,646 | B1 | 7/2004 | Ford et al. |
| 7,389,644 | B1 | 6/2008 | Nakhamkin |
| 8,373,295 | B2 | 2/2013 | Hoffmann et al. |
| 8,479,523 | B2 | 7/2013 | Berry |
| 8,796,874 | B2 | 8/2014 | Hoffmann et al. |
| 2009/0249794 | A1 | 10/2009 | Wilkes et al. |
| 2011/0094236 | A1 | 4/2011 | Finkenrath et al. |
| 2013/0061591 | A1 * | 3/2013 | Bove ............... F02C 6/16 60/645 |
| 2014/0060067 | A1 | 3/2014 | Mazumder et al. |
| 2014/0074311 | A1 | 3/2014 | Kearns et al. |
| 2014/0142779 | A1 | 5/2014 | Stoettrup et al. |
| 2014/0210217 | A1 | 7/2014 | Scipio et al. |
| 2014/0244055 | A1 | 8/2014 | Rosson |
| 2015/0184593 | A1 | 7/2015 | Kraft et al. |

FOREIGN PATENT DOCUMENTS

| | | |
|---|---|---|
| WO | 2010/085272 A1 | 7/2010 |
| WO | 2013/151909 A1 | 10/2013 |
| WO | 2014/066276 A2 | 5/2014 |
| WO | 2016/142654 A1 | 9/2016 |

OTHER PUBLICATIONS

"Sensing a winner, kraft rolls out TurboPHASE on the industry's biggest stage," Combined Cycle Journal, Third Quarter, pp. 40 and 42 (2013).

Lamonica, M., "Liquefied Air to Store Energy on U.K. Grid," IEEE Spectrum, Posted on Feb. 18, 2014, Retrieved from the Internet URL: http://spectrum.ieee.org/energywise/energy/the-smarter-grid/liquefied-air-to-store-energy-on-uk-grid, on Apr. 7, 2014, pp. 1 and 2.

Extended European Search Report and Opinion issued in connection with corresponding EP Application No. 16178318.8 dated Dec. 13, 2016.

Extended European Search Report and Opinion issued in connection with related EP Application No. 16181269.8 dated Jan. 4, 2017.

* cited by examiner

POWER AUGMENTATION SYSTEM FOR A GAS TURBINE

FIELD OF THE INVENTION

The present invention generally involves a power plant having a gas turbine and a generator for providing power to a grid. More specifically, the invention relates to a power augmentation system for augmenting power from the gas turbine during an under-frequency event.

BACKGROUND OF THE INVENTION

Large increases in the electrical power demand placed upon an electrical power distribution grid will tend to reduce the electrical operational frequency of the grid, causing an "under-frequency" event. For example, a heavy or sudden electrical demand may cause a particular power distribution grid having a nominal operational frequency of 50 Hz to momentarily operate at 49 Hz. An under-frequency event may last from several seconds to several minutes and are generally short in duration.

In conventional electrical power generation systems that utilize one or more heavy-duty industrial gas turbine for supplying electrical power to the grid, the rotational speed of each turbine supplying power to the grid is synchronized to the electrical frequency of the grid. As the rotational speed of a gas turbine decreases with other things being equal, its power output correspondingly decreases. Consequently, during an under-frequency event, a gas turbine will tend to output at a lower power.

Grid code regulations typically require that power generation equipment have the capability to maintain load during under-frequency events. Typically, in response to a power grid under-frequency event, gas turbine operators meet these requirements by increasing firing temperature of the gas turbine to maintain generator output within requirements. Increases in firing temperature increase power output at a given pressure ratio, which works adequately when the gas turbine does not approach any operating limits such as maximum pressure ratio capability or maximum inlet guide vane (IGV) position.

A firing temperature increase is typically achieved by an increase the fuel flow supplied to the combustor. All things otherwise equal, the increase in fuel flow results in a higher pressure at the turbine inlet, which in turn applies backpressure on the compressor. Eventually, adding more flow results in a compressor pressure limit, which typically is observed by limiting the flow through the turbine through the diversion of compressor discharge air to inlet (inlet bleed heating) and/or reduction of fuel flow (and consequently firing temperature). However, this method has limited capability to meet grid code requirements for cool ambient conditions and/or low Btu fuels (e.g. syngas) applications, due to operability limits encountered by the gas turbine compressor.

Some conventional power generating gas turbines incorporate variable inlet guide vanes (IGV). Such variable guide vanes provide the ability to adjust compressor airflow by changing incidence angle (i.e., the difference between the air angle and the mean line angle at the compressor blade leading edge) in the front stages of the compressor. These variable IGVs permit an acceptable compressor surge-free operation margin to be maintained. Typically, maintaining surge-free operation is a vital operational criterion of the compressor component for gas turbines. However, not all gas turbines are equipped with IGVs to permit employing such a technique. Further, this action alone may not be sufficient if the maximum vane position is reached and a pressure ratio limit is encountered simultaneously while attempting to increase output. In this situation, other action must be taken to alleviate the pressure limit.

Therefore a system for temporarily augmenting power of the gas turbine during an under-frequency event to provide improved grid code compliance would be desirable.

BRIEF DESCRIPTION OF THE INVENTION

Aspects and advantages of the invention are set forth below in the following description, or may be obvious from the description, or may be learned through practice of the invention.

One embodiment of the present invention is directed to a power augmentation system for a gas turbine that is electrically coupled to a power grid. The system includes, in serial flow order, a compressed air supply, a compressed air storage tank that is in fluid communication with the compressed air supply and an expansion turbine that is disposed downstream from the compressed air storage tank. An exhaust outlet of the expansion turbine is in fluid communication with at least one of an inlet section or a compressor of the gas turbine.

Another embodiment of the present disclosure is directed to a power plant. The power plant includes a gas turbine having an inlet section, a compressor downstream from the inlet section, a combustion section downstream from the compressor, a turbine downstream from the combustion section and a generator for supplying power to a power grid. The power plant further includes a power augmentation system. The power augmentation system comprises a compressed air supply, a compressed air storage tank that is downstream from and in fluid communication with the compressed air supply and an expansion turbine disposed downstream from the compressed air storage tank. An exhaust outlet of the expansion turbine is in fluid communication with at least one of the inlet section or the compressor of the gas turbine.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
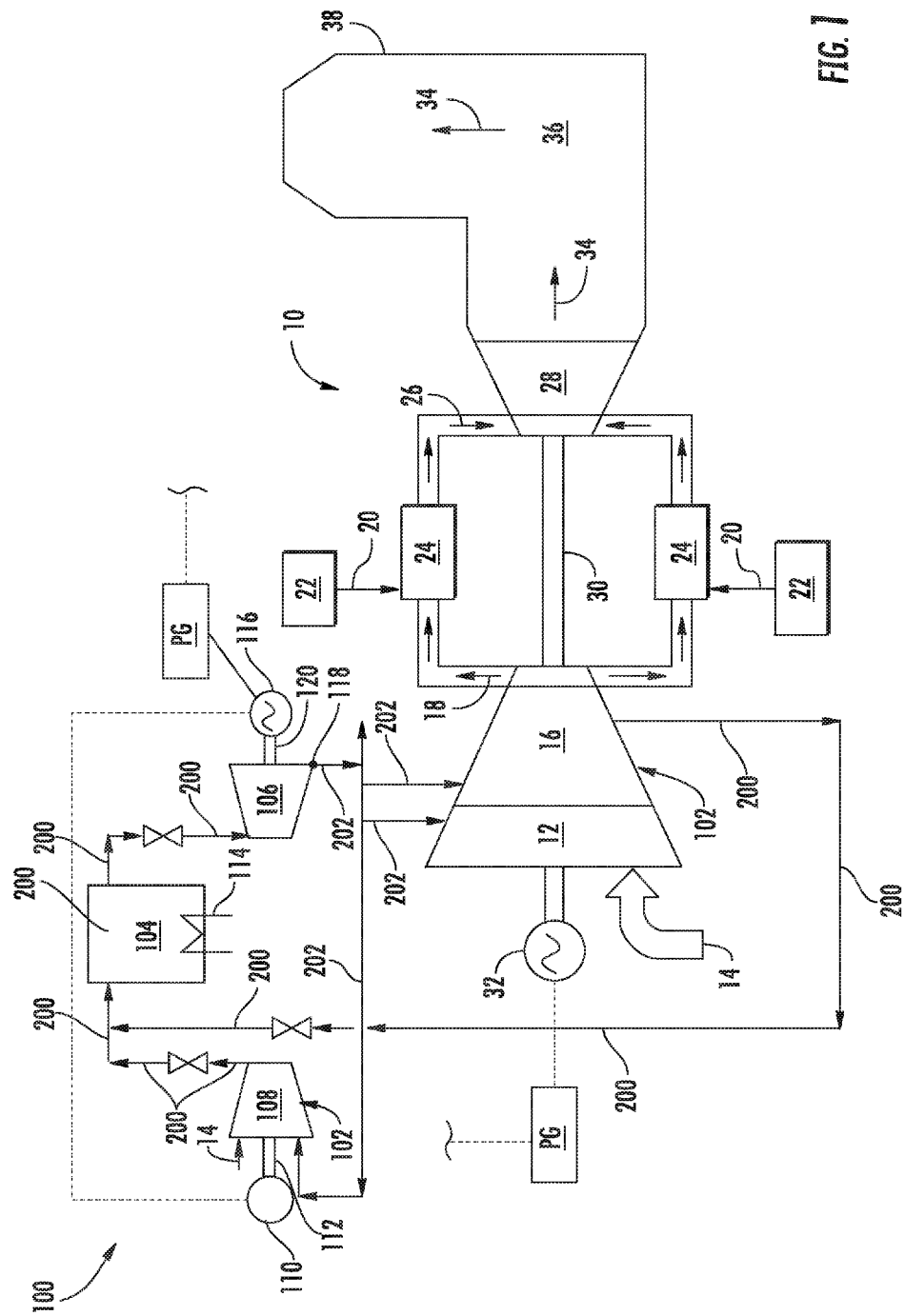
FIG. 1 is a functional block diagram of an exemplary gas turbine including a power augmentation system according to at least one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring now to the drawings, wherein identical numerals indicate the same elements throughout the figures, FIG. 1 provides a functional block diagram of an exemplary power plant including a gas turbine 10 and a power augmentation system 100 according to at least one embodiment of the present invention. As shown, the gas turbine 10 generally includes an inlet section 12 that may include a series of filters, cooling coils, moisture separators, and/or other devices to purify and otherwise condition air 14 or other working fluid entering the gas turbine 10. The air 14 flows to a compressor section where a compressor 16 progressively imparts kinetic energy to the air 14 to produce compressed air 18.

The compressed air 18 is mixed with a fuel 20 from a fuel supply system 22 to form a combustible mixture within one or more combustors 24. The combustible mixture is burned to produce combustion gases 26 having a high temperature, pressure and velocity. The combustion gases 26 flow through a turbine 28 of a turbine section to produce work. For example, the turbine 28 may be connected to a shaft 30 so that rotation of the turbine 28 drives the compressor 16 to produce the compressed air 18. Alternately or in addition, the shaft 30 may connect the turbine 28 to a generator 32 for producing electricity. The generator 32 is electrically coupled or connected to and/or synchronized with a power grid PG. Exhaust gases 34 from the turbine 28 flow through an exhaust section 36 that connects the turbine 28 to an exhaust stack 38 downstream from the turbine 28. The exhaust section 36 may include, for example, a heat recovery steam generator (not shown) for cleaning and extracting additional heat from the exhaust gases 34 prior to release to the environment.

In various embodiments, the power augmentation system 100 or "system" includes, in serial flow order, at least one compressed air supply 102, a compressed air storage tank 104 herein referred to as "air tank", and an expansion turbine 106. The compressed air supply 102 provides a compressed air as indicated schematically via arrows 200 via various fluid conduits, valves and/or couplings to the air tank 104.

The compressed air supply 102 may comprise one or multiple compressed air supplies. For example, in one embodiment, the compressed air supply 102 includes an auxiliary compressor 108 that is operated independent of the compressor 16 of the gas turbine 10. The auxiliary compressor 108 may be any suitable compressor type. For example, the auxiliary compressor 108 may be a reciprocating compressor, a rotary screw compressor or a centrifugal compressor. In one embodiment, as shown in FIG. 1, the auxiliary compressor 108 is an axial compressor. In particular embodiments, the auxiliary compressor 108 may be driven by an electric motor 110 and/or by a shaft 112. The shaft 112 may couple the auxiliary compressor 108 to the motor 110 and/or may couple the auxiliary compressor 108 to the expansion turbine 106. In one embodiment, the compressed air supply 102 includes the compressor 16 of the gas turbine 10. In one embodiment, the system 100 may include both the auxiliary compressor 108 and the compressor 16 of the gas turbine 10 with both being in fluid communication with the air tank 104.

In particular embodiments, a heat exchanger 114 may be thermally coupled to the air tank 104. In this manner, the temperature of the compressed air 200 stored within the air tank 104 may be regulated. In particular embodiments, a generator 116 may be coupled via shaft 120 to the expansion turbine 106. The generator 116 may be used for generating power. The generator 116 may be electronically coupled to the power grid PG and/or may be coupled to the motor 110 of the compressed air supply 102. The expansion turbine 106 may be fluidly coupled to the gas turbine 10 and/or the compressed air supply 102 via various fluid conduits, valves and/or couplings fluidly coupled to an exhaust outlet 118 of the expansion turbine 106. In one embodiment, the expansion turbine 106 is fluidly coupled to the inlet section 12. In one embodiment, the exhaust outlet 118 of the expansion turbine 106 is fluidly connected to the compressor 16. In one embodiment, the exhaust outlet 118 of the expansion turbine 106 may be fluidly coupled to both the inlet section 12 and to the compressor 16.

In operation, the compressed air supply 102 charges or pressurizes the air tank 104 with compressed air 200 to a desired pressure P1. In particular embodiments, the auxiliary compressor 108 may be operated via the motor 110 to provide the compressed air 200 to the air tank 104. In addition or in the alternative, at least a portion of the compressed air 200 may flow from the compressor 16 of the gas turbine to the air tank 104.

Pressure of the compressed air 200 stored in the air tank 104 may be monitored via various pressure sensors and adjusted via the compressed air supply 102 and/or various valves as needed to maintain an operable pressure within the air tank 104. If so equipped, the heat exchanger 114 may cool or heat the compressed air 200 within the air tank 104 to a desired or operable temperature. For example, the heat exchanger 114 may help to maintain the compressed air 200 stored in the air tank 104 to approximately ambient air or below ambient air temperatures.

During an under-frequency grid event, power output of the gas turbine 10 is reduced when the rotational speed of the shaft 30 drops, at least in part, because the shaft 30 is synchronized and runs at the same rotational speed as the grid frequency. In response, the system 100 may be activated automatically or via a controller (not shown) so as to release, in a metered fashion, the compressed air 200 to the expansion turbine 106. As the compressed 200 air flows through the expansion turbine 106, the compressed air 200 rapidly expands. The rapid expansion of the compressed air 200 within the expansion turbine 106 causes discharge air 202 flowing form the exhaust outlet 118 of the expansion turbine 106 to have a lower than ambient air temperature. For example, the discharge air 202 may reach below −200 degrees F. depending on operating conditions of the system 100 and/or the gas turbine 10.

At this point, at least a portion or all of the discharge air 202 may be provided to one or both of the compressor 16 and/or the inlet section 12 and may then be ingested into the compressor 16. In one embodiment, the discharge air 202 is routed into an inlet of the compressor 16. The relatively cold discharge air 202 is mixed with the ambient air 14, thereby causing the compressor inlet temperature to drop. This cooling impact temporarily augments or increases power output of the gas turbine 10, thereby reducing or eliminating potential negative thermal and/or mechanical effects of over-firing the gas turbine 10 to temporarily increase power output.

In particular embodiments, kinetic energy created by the rapidly expanding compressed air within the expansion turbine 106 may be converted to rotational energy via turbine blades (not shown) coupled to a shaft thus causing shaft 120 that couples the expansion turbine 106 to the generator 116 to rotate, thereby causing the generator 116 to generate additional power for the grid and/or power for operating the motor 110 attached to the auxiliary compressor 108 and/or other auxiliary equipment onsite.

In particular embodiments, during normal operation of the gas turbine 10 (i.e. non-under frequency operation), a portion of the compressed air 200, in metered fashion, may be directed from the air tank 104 through the expansion turbine 106, thus causing shaft 120 to rotate and generate power for the grid and/or power for operating the motor 110 attached to the auxiliary compressor 108 and/or other auxiliary equipment onsite. At this point, at least a portion or all of the discharge air 202 may be provided to one or both of the compressor 16 and/or the inlet section 12 and may then be ingested into the compressor 16. In addition or in the alternative, the discharge air 202 may be distributed back to the auxiliary compressor 108.

Figure 2:
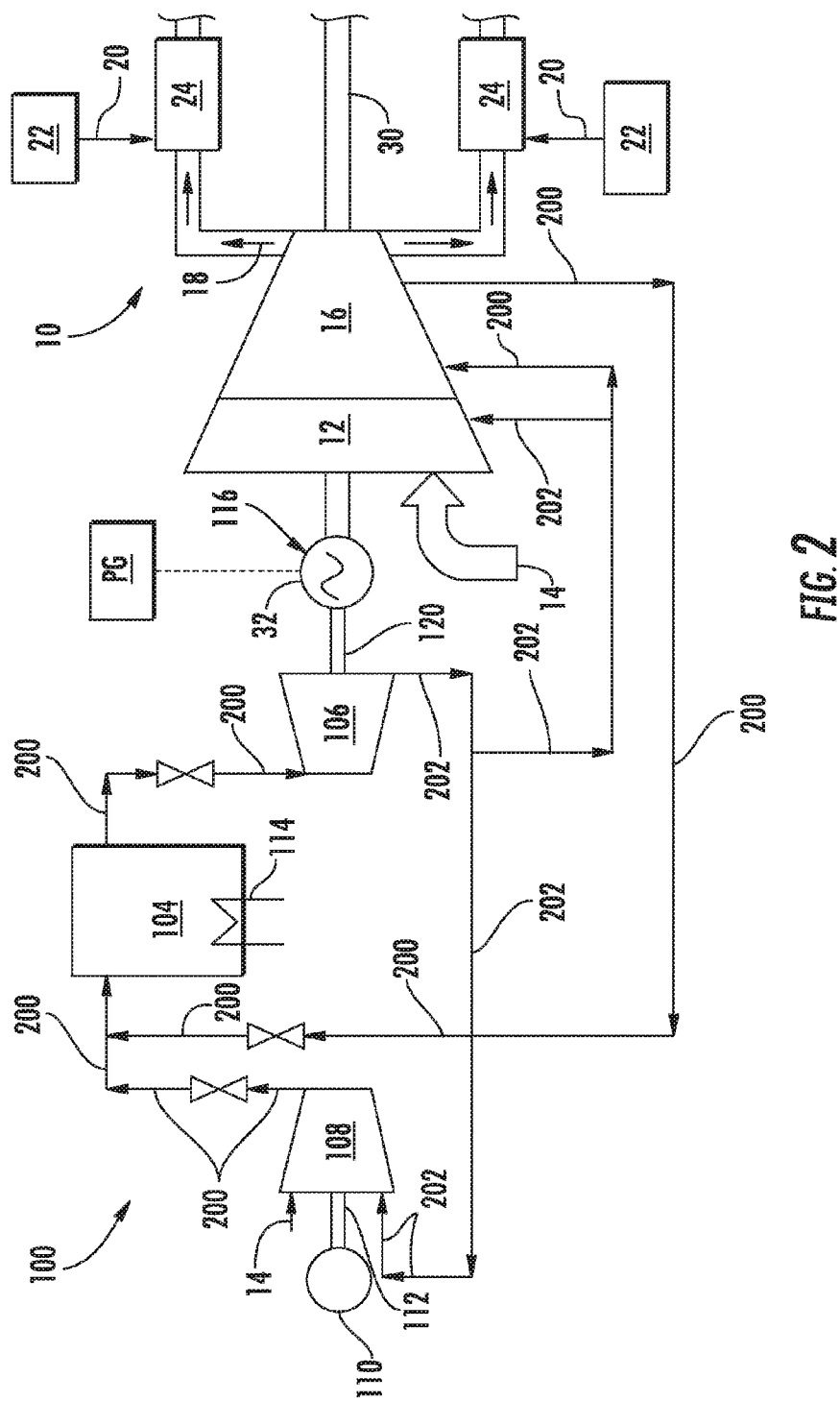
FIG. 2 is a functional block diagram of an exemplary gas turbine including a power augmentation system according to at least one embodiment of the present invention.

FIG. 2 provides a functional block diagram of the exemplary power plant including a portion of the gas turbine 10 and the power augmentation system 100 according to at least one embodiment of the present invention. In particular embodiments, as shown in FIG. 2, the expansion turbine 106 may be coupled to shaft 30 of the gas turbine via shaft 120 and/or various other components including a turning gear (not shown) and/or other means. In this manner, the expansion turbine 106 may be used as a startup motor or Load Communication Inverter, LCI. In one embodiment, the expansion turbine 106 may be coupled to generator 32 and/or generator 116 for producing electricity.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A power augmentation system for a gas turbine electrically coupled to a power grid, comprising:
    a compressed air supply including a compressor of the gas turbine;
    a compressed air storage tank in fluid communication with the compressed air supply, the compressed air storage tank being configured to receive compressed air from the compressor of the gas turbine; and
    an expansion turbine disposed downstream from the compressed air storage tank, wherein an exhaust outlet of the expansion turbine is in fluid communication with the compressor of the gas turbine, the compressed air storage tank being configured to provide the compressed air to the compressor of the gas turbine via the expansion turbine.

2. The power augmentation system as in claim 1, wherein the compressed air supply comprises an auxiliary compressor.

3. The power augmentation system as in claim 1, wherein a shaft of the expansion turbine is coupled to a rotor shaft of the gas turbine.

4. The power augmentation system as in claim 1, wherein the compressed air supply comprises an auxiliary compressor, wherein the auxiliary compressor is an axial compressor.

5. The power augmentation system as in claim 1, wherein the compressed air supply comprises an auxiliary compressor, the system further comprising an electric motor coupled to the compressed air supply.

6. The power augmentation system as in claim 1, further comprising a generator coupled to the expansion turbine via a shaft.

7. The power augmentation system as in claim 6, wherein the generator is electrically coupled to a power grid.

8. The power augmentation system as in claim 6, wherein the compressed air supply comprises an auxiliary compressor, the system further comprising an electric motor coupled to the compressed air supply, wherein the generator is electrically coupled to the motor.

9. The power augmentation system as in claim 1, wherein the compressed air supply comprises an auxiliary compressor, wherein the exhaust outlet of the expansion turbine is fluidly coupled to the auxiliary compressor.

10. The power augmentation system as in claim 1, wherein the compressed air supply comprises an auxiliary compressor, the system further comprising a shaft that mechanically couples the auxiliary compressor to the expansion turbine.

11. The power augmentation system as in claim 1, further comprising a heat exchanger in thermal communication with the compressed air storage tank.

12. A power plant, comprising:
    a gas turbine having an inlet section, a compressor downstream from the inlet section, a combustion section downstream from the compressor, a turbine downstream from the combustion section and a generator for supplying power to a power grid; and
    a power augmentation system, the power augmentation system comprising:
    a compressed air supply including the compressor of the gas turbine;
    a compressed air storage tank in fluid communication with the compressed air supply, the compressed air storage tank being configured to receive compressed air from the compressor of the gas turbine; and
    an expansion turbine disposed downstream from the compressed air storage tank, wherein an exhaust outlet of the expansion turbine is in fluid communication with the compressor of the gas turbine, the compressed air storage tank being configured to provide the compressed air to the compressor of the gas turbine via the expansion turbine.

13. The power plant as in claim 12, wherein the compressed air supply comprises an auxiliary compressor.

14. The power plant as in claim 12, wherein a shaft of the expansion turbine is coupled to a rotor shaft of the gas turbine.

15. The power plant as in claim 12, wherein the compressed air supply comprises an auxiliary compressor, wherein the auxiliary compressor is an axial compressor.

16. The power plant as in claim 12, wherein the compressed air supply comprises an auxiliary compressor, the system further comprising an electric motor coupled to the compressed air supply.

17. The power plant as in claim 12, further comprising a generator coupled to the expansion turbine via a shaft, wherein the generator is electrically coupled to the power grid.

18. The power plant as in claim 12, wherein the compressed air supply comprises an auxiliary compressor, the system further comprising an electric motor coupled to the compressed air supply, wherein the generator is electrically coupled to the motor.

19. The power plant as in claim 12, wherein the compressed air supply comprises an auxiliary compressor, wherein the exhaust outlet of the expansion turbine is fluidly coupled to the auxiliary compressor.

20. The power plant as in claim 12, further comprising a heat exchanger in thermal communication with the compressed air storage tank.

\* \* \* \* \*